United States Patent [19]

Bruns

[11] 4,427,899
[45] Jan. 24, 1984

[54] CIRCUIT ARRANGEMENT FOR SECURING THE SUPPLY VOLTAGE SUPPLY OF AN ELECTRONIC LOAD

[75] Inventor: Hartmut Bruns, Bürnhorn, Fed. Rep. of Germany

[73] Assignee: Siemens Aktiengesellschaft, Berlin and Munich, Fed. Rep. of Germany

[21] Appl. No.: 363,935

[22] Filed: Mar. 31, 1982

[30] Foreign Application Priority Data

Mar. 31, 1981 [DE] Fed. Rep. of Germany ....... 3113523

[51] Int. Cl.³ .................... H01H 83/12; H02H 3/24
[52] U.S. Cl. .................................. 307/66; 307/130; 307/200 A; 361/88
[58] Field of Search .............. 307/64, 66, 200 A; 365/229; 323/274, 281; 371/66; 361/18, 88, 98, 92

[56] References Cited

U.S. PATENT DOCUMENTS 4,342,922 8/1982 DiMassimo et al. ............... 307/66

FOREIGN PATENT DOCUMENTS 19222 11/1980 European Pat. Off. .

OTHER PUBLICATIONS

"Electronics" Jan. 1981, pp. 129-132.

Primary Examiner—E. A. Goldberg
Assistant Examiner—Todd E. DeBoer
Attorney, Agent, or Firm—Kenyon & Kenyon

[57] ABSTRACT

A circuit for assuring the supply of voltage to an electronic circuit can be switched to an auxiliary voltage source via a series-connected, self-conducting field-effect transistor when the supply source fails. The circuit, which is realized with very little circuitry, has a voltage divider connected across the load; a tap on the voltage divider is connected to the gate electrode of the transistor. The invention is useful, for example, for protecting data in C-MOS memories of microprocessors.

1 Claim, 1 Drawing Figure

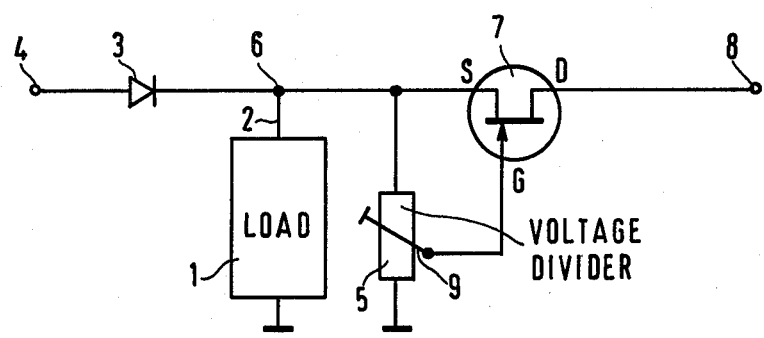

CIRCUIT ARRANGEMENT FOR SECURING THE SUPPLY VOLTAGE SUPPLY OF AN ELECTRONIC LOAD

BACKGROUND OF THE INVENTION

This invention relates to a supply circuit for assuring the supply of voltage to an electronic load. More particularly, the invention relates to such a supply circuit for protecting data in the memory of a microprocessor in which the load is connected, via a series-connected rectifier, to a supply voltage and, via the series-connected drain-source path of a field-effect transistor, to an auxiliary supply voltage. The electronic load is connected in shunt to both supplies, one of its terminals being connected to the source electrode of the transistor.

A circuit arrangement of this general type, described in "Electronics," January 1981, pp. 129–132, contains a self-blocking field-effect transistor which is controlled by a comparator. A portion of the supply voltage is connected to the inverting input of the comparator; the non-inverting input is connected to an auxiliary voltage supply in the form of a battery. In this circuit, the connection is established every time a change of the supply voltage is detected by a processor. The comparator can then make a voltage comparison between the applied portion of the voltage from the supply voltage source and the voltage from the auxiliary voltage supply. If the voltages are equal, a switching signal is given to the gate electrode of the self-blocking field-effect transistor, the transistor is switched into conduction, and the electronic load is connected to the auxiliary voltage supply.

In another known circuit arrangement (EP-A-0 019 222), an electronic load is connected to a supply voltage via a first, self-blocking, field-effect transistor. An auxiliary voltage supply is connected in series with a diode which is polarized to become conducting if the level of the supply voltage drops. The auxiliary voltage supply, however, is only connected to the load, via a TTL logic circuit, when a transistor has been cut off. The logic circuit thereupon switches another self-blocking, field-effect transistor into conduction and closes the circuit from the auxiliary voltage supply to the electronic load.

The above-described circuit arrangements are relatively elaborate. It is therefore an object of the present invention to provide a circuit for assuring the supply of voltage to an electronic load which provides interruption-free switching of the load from a main voltage supply to an auxiliary voltage supply and which requires very little circuitry, being therefore very reliable.

SUMMARY OF THE INVENTION

The above problem is solved by the present invention in which the load is connected, via a series-connected rectifier, to a main voltage supply and, via the series-connected source-drain path of a self-conducting field-effect transistor, to an auxiliary voltage supply, the load and a voltage divider being connected in shunt to the supplies. The gate electrode of the self-conducting field-effect transistor is connected to a tap on the voltage divider. The source electrode of the transistor is connected to the rectifier and the load and the drain electrode of the transistor is connected to the auxiliary supply.

Among other things, the circuit of the invention has the advantage of being a very simple design since it consists only of a self-conducting field-effect transistor and a voltage divider. In addition, the circuit of the invention has the advantage that it makes voltage stabilization possible, even at very small current levels where stabilization is not achievable with Zener diodes. The same applies to switching from the voltage supply to the auxiliary voltage supply.

While the supply voltage source will, as a rule, be a power supply, the auxiliary voltage supply may be realized in different ways. The auxiliary supply may, for instance, consist of another power supply which is desirably fed from a circuit other than the power supply which serves as the main voltage supply. Preferably, however, the auxiliary voltage supply is a primary or a storage battery and is therefore independent of power network failure. The auxiliary voltage supply may also consist of a charged capacitor.

BRIEF DESCRIPTION OF THE DRAWING

A circuit illustrating the teachings of the invention is shown in the sole FIGURE.

DETAILED DESCRIPTION OF THE INVENTION

In the illustrated embodiment, electronic load 1, such as a C-MOS memory chip whose voltage supply is to be assured, is connected via line 2 to a terminal 6. Terminal 6 is connected via rectifier 3 to a terminal 4. A main power supply (not shown) for electronic load 1 is connected to terminal 4 and is thus connected in shunt to the load.

Voltage divider 5 is connected to terminal 6 and is therefore connected in parallel to load 1. Source electrode S of self-conducting field-effect transistor 7 is also connected to terminal 6, while drain electrode D of the transistor is connected to a terminal 8. Terminal 8 serves as the connection for an auxiliary voltage supply, not shown, such as a primary cell or a storage battery. The drain-source path of field-effect transistor 7 is thus series-connected between the load and the auxiliary voltage. Gate electrode G of field-effect transistor 7 is connected to tap 9 on voltage divider 5. The transistor 7 may be a p-channel or an n-channel field-effect transistor, depending on the polarity of the voltage supplies.

The circuit arrangement operates as follows. If the main supply voltage fails, the voltage at input terminal 4 drops, as does the voltage applied to electronic load 1. When the voltage applied to self-conducting field-effect transistor 7 drops below the pinch-off voltage, the level of the applied voltage being set by voltage divider 5, transistor 7 becomes conducting and the voltage supply for load 1 is obtained from the auxiliary voltage supply at terminal 8. A sufficient supply voltage is therefore maintained at electronic load 1, even when the main voltage supply fails.

When the power circuit or the main voltage supply becomes active again, a higher voltage appears at circuit point 6. This results in the appearance at the gate electrode of the transistor of a voltage from voltage divider 5 which is higher than the transistor pinch-off voltage. Field-effect transistor 7 is thereby blocked; the auxiliary voltage supply is no longer drawn upon since the main supply has again assumed the load.

What is claimed is:

1. A circuit for assuring the supply of voltage to an electronic load, comprising:

a first terminal for making connection to a main voltage supply;

a load coupled to the first terminal via a rectifier;
a second terminal for making connection to an auxiliary voltage supply;
a self-conducting field-effect transistor having a gate electrode, a source electrode, and a drain electrode, the source electrode coupled to the load and to the rectifier, the drain electrode coupled to the second terminal; and
a voltage divider connected in shunt to the load, the voltage divider having a tap which is directly connected to the gate electrode.

* * * * *